June 30, 1964  W. E. TRIFILLIS  3,139,249
ENERGY ABSORBER UNIT
Filed May 5, 1962  2 Sheets-Sheet 1

INVENTOR
William E. Trifillis

BY  Herbert M Birch
ATTORNEY

June 30, 1964 W. E. TRIFILLIS 3,139,249
ENERGY ABSORBER UNIT
Filed May 5, 1962 2 Sheets-Sheet 2

INVENTOR
William E. Trifillis
BY Herbert M. Birch
ATTORNEY

United States Patent Office 3,139,249
Patented June 30, 1964

3,139,249
ENERGY ABSORBER UNIT
William E. Trifillis, Rehoboth, Del., assignor to All American Engineering Company, Wilmington, Del., a corporation of Delaware
Filed Mar. 5, 1962, Ser. No. 177,492
6 Claims. (Cl. 244—110)

The present invention relates generally to an energy absorber for arresting mobile objects. More particularly the same relates to apparatus employing a fluid coupling to absorb energy for such objects.

The principal object of this invention is to impart the energy developed from a decelerating object to a fluid-type energy absorber to transmit the fluid therein in a rapid flow pattern, to thereby work against itself by a constant reversal of fluid flow to absorb energy.

Another object is to provide a plurality of units adapted to be interchanged and varied in number as desired.

Still another object is to provide a novel heat transfer system in association with a fluid-type energy absorber.

Another object is to provide in a combination, a unit including an energy absorber with an arrest cable for arresting aircraft and a simple retrieve unit for recycling the absorber after each arrest operation.

The above and other objects and advantages of the present invention will appear more fully hereinafter from a consideration of the detailed description which follows, taken with the accompanying drawings wherein an embodiment thereof is illustrated. It is to be expressly understood, however, that the drawings are for the purpose of illustration only and are not intended as a definition of the limits of the invention.

In the drawings, wherein like reference characters refer to like parts throughout the several views.

Figure 1:
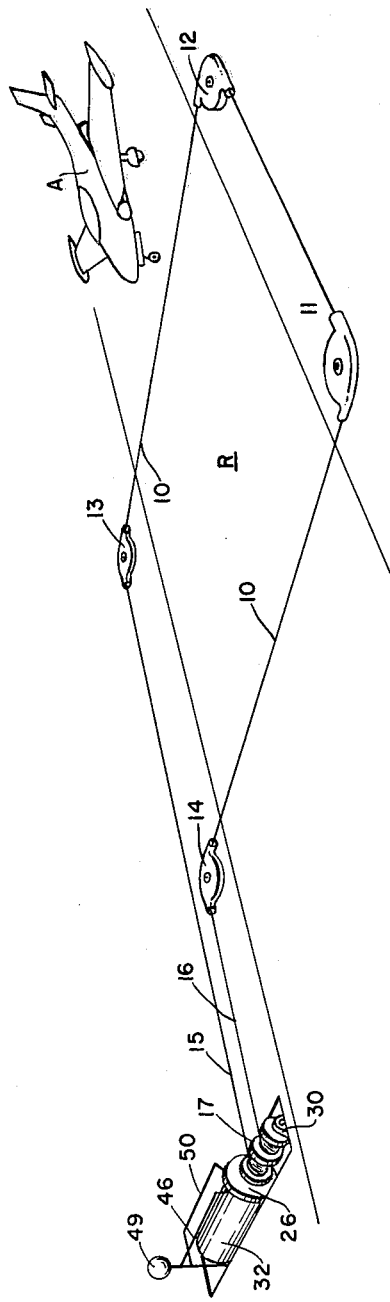
FIGURE 1 is an aerial view showing the present invention mounted for use with respect to a landing surface for aircraft.
Figure 3:
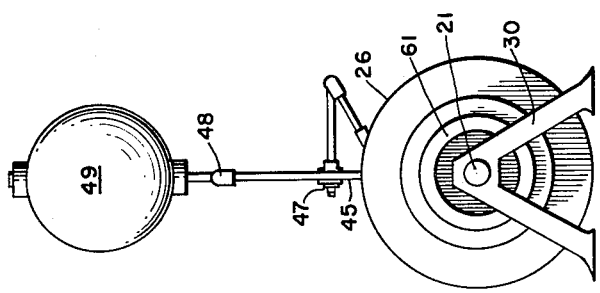
FIGURE 3 is an end view of the right-hand end of the arrangement shown in FIGURE 2.

Referring to the drawings and first with particular reference to FIGURE 1, there is shown a landing surface R traversed by a bridle loop or arresting cable 10, preferably of nylon reeved about guide means, such as sheaves 11, 12, 13 and 14. The cable 10 pays off from sheaves 13 and 14 into spaced apart straight cable sections 15 and 16 and each respective section winds and unwinds from a cable reel 17 mounted to one side of the surface R, as shown.

The cable reel 17 is formed with two spaced drums 18 and 19 and is made with a spirally grooved bore adapted to revolve a shaft 21 formed with groove cooperating helical splines 22 to provide a cable level wind. The shaft 21 terminates beyond the inner end of the reel into a ratchet or one-way clutch 23 formed between its aligned end and the end of a second elongated impeller shaft 24.

The shaft 24 has keyed thereto a cable retrieve means, such as a rotary turbine 25 in a turbine housing 26, hereinafter referred to under the operation heading. This housing is centrally apertured to mount the aligned contiguous ends of the respective shafts 21 and 24 in bearings 27 and 28, said shaft 21 also being journalled at one end in a bearing 29 in a reel support 30, while shaft 24 extends through a cylindrical housing 32 containing web bearing supports 33 and 34 to the housing end plate 35 and a bearing socket 36, see FIGURE 2.

The housing 32 is shown mounted in a horizontal position, and at spaced longitudinal intervals is formed with stator blades 40. These stator blades and the housing are suitably fixed against rotation and such blades are each formed with centrally aligned openings for the impeller shaft 24, to which are keyed in longitudinally spaced relation, a plurality of impeller blades 41, arranged so that there is one impeller blade for each adjacent stator blade, see FIGURE 2.

The housing 32 contains a hydraulic pump P to maintain volume and pressure therein, particularly during retrieving and pumps in fluid from a conduit 43 through a check valve 42. The conduit 43 has an elbow coupling 44 to an upstanding conduit 45 having a manual selector valve 47 for by-passing flow to branch conduit 46 to the turbine housing 32 for cable retrieve operation. Beyond valve 47 the conduit 43 goes to a T-coupling 48 to an accumulator or reservoir 49, while it extends from the center key of the T-coupling 48, through a horizontal conduit 50 to the first stator-impeller unit of the energy absorber housing 32. In this line or conduit 50 may be placed a pressure relief valve 52, to thereby relieve excess pressures, which may develop during use of the energy absorber.

The lower or belly portion of the energy absorber housing 32 is formed with spaced pairs of inlet and outlet opening to connect with inlet and outlet tubes 54 and 55, respectively of respective fluid circulating manifold means 56 and 57, which connect to a heat exchange or heat transfer means 58.

Operation

The operation of the device is dependent upon a moving object, such as an airplane A engaging and pulling on the bridle or arrest cable 10, see FIGURE 1. When this occurs each of the cable ends around the two-drum reel 17 unwind or pays out therefrom causing rotation of the wheel, which through the helical shaft 21 and one-way clutch 23 imparts rotation to the impeller shaft 24 and its associate impeller blades 41 with respect to their respective adjacent fixed stator blades 40.

Each impeller and stator blade unit is preferably housed as one assembled unit, whereby any number of such assemblies may be joined together on one through shaft as required.

When the shaft 24 and the impellers 41 rotate, fluid in the housing is thrown by centrifugal force to the respective outside edges of the impeller blades or vanes. This causes the velocity of the fluid to increase, thereby consuming energy and the fluid in the housing is guided by the housing to the roots of the stator vanes 40 and toward the center of the impeller vanes.

The setting of the stator vanes 40 is such as to receive the fluid in a manner tending to rotate the stator vanes, if they were free to rotate.

Since the stator blades are all securely mounted to the housing bore and cannot rotate, they absorb more energy from the flow of fluid and the residual energy is further absorbed by the stator vanes being set at an angle to the impeller blades 41, whereby the fluid re-enters the impeller blades in a direction opposing the impeller rotation. Accordingly, through every cycle of a particle of fluid passing from the stator to the impeller, the opposing force is increased during an arrest. This constant reversal of fluid flow absorbs energy with an approach to maximum efficiency.

Figure 2:
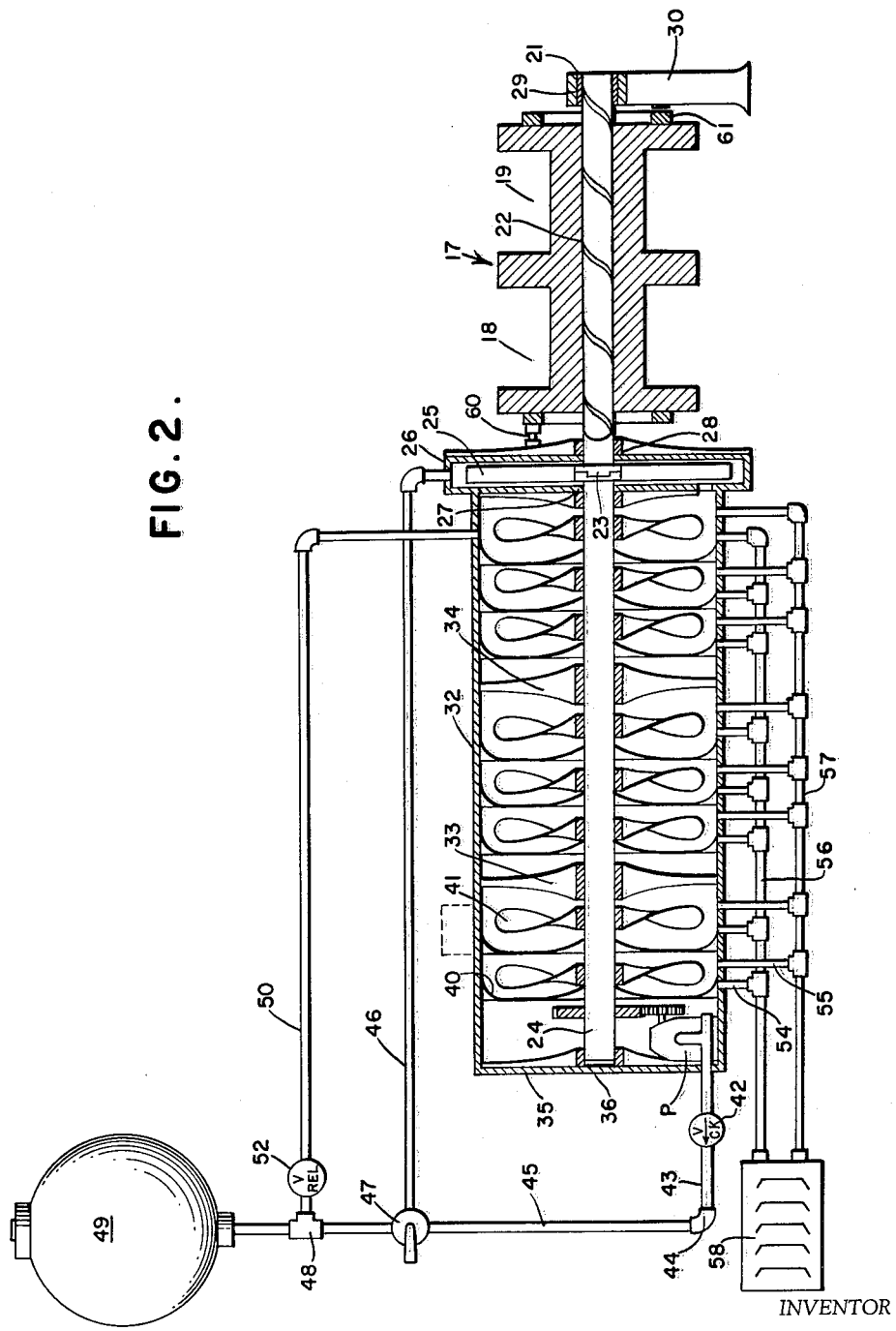
FIGURE 2 is a side semi-diagrammatic view partly in cross section of the complete energy absorber and retriever means.

Each drum 18 and 19 of the reel 17 is equipped with brake shoes or pucks 60 and 61, see FIGURE 2, to prevent overrun of the drums carrying the cable at initial payout, and to control the level wind, such as the helical spline 22 on the shaft 21, which serves to correct for the payout angle of the arrest cable ends 15 and 16.

After each arrest operation, the gear driven pump P is used to furnish a volume of fluid under pressure to drive the retrieve turbine 25.

The check valve 42 and selector valve 47 are used to direct a fluid jet from conduit 46 against the turbine blades. The one-way clutch or the like 23 prevents turning of the impeller shaft during the retrieve operation.

Thus there is provided a novel energy absorber for arresting aircraft or the like arranged to absorb energy by constantly displacing and reversing a flow of fluid, until an arrest has been completed and whereby a novel retrieving system in fluid connection with the energy absorber may be simply operated to retrieve the arrest cable and reset the energy absorber for the next arrest.

Without further description it is believed that the advantages of the present invention over the prior art is apparent and while only one embodiment of the same is illustrated, it is to be expressly understood that the same is not limited thereto as various changes may be made in the combination and arrangement of the parts illustrated, as will not likely appear to others and those skilled in the art. For a definition of the scope or limits of the invention, reference should be had to the appended claims.

What is claimed is:

1. An energy absorber unit comprising a fixed liquid filled housing, an axially aligned double spool reel exterior of an end of said housing, said reel being reversely rotatable and axially movable after cable payout, a cable wrapped around each spool section of said reel, rotary impeller means in the housing having a shaft drivably coupled to said reel in one direction during cable payout, said cable during unwinding from each spool of the reel, thereby rotating the reel and the said rotary impeller means in the housing, whereby torque from said impeller means is applied to said cable reel to resist the unwinding of said cable from the spool of said reel, said shaft being disconnected from said reel when said reel is rotated in a reverse direction from cable payout direction.

2. An energy absorber unit comprising a compound reel, said reel having two integrally formed aligned cable winding drums, a loop of cable having each end of the loop wound on one of the drums so as to leave an extended center arrest loop portion, said loop being reeved across a landing surface, an elongated housing and liquid immersed impeller means in the housing operatively coupled to said reel during payout of said cable ends therefrom, said impeller means rotating in said housing against the resistive action of liquid therein to retard the rotation of said reel caused by the unwinding of said ends of the cable loop from said aligned cable winding drums of the reel when the said loop is placed under load.

3. An energy absorber unit as described in claim 2, wherein said coupling between said brake and said reel is a one-way clutch engageable by axial displacement of said reel only in the direction of payout of said cable from the reel.

4. An energy absorber unit comprising a reel, said reel having aligned cable winding drums, a loop of cable having each end of the loop wound on one of the drums so as to leave an extended center arrest loop portion, said loop being reeved across a landing surface, a fluid brake operatively coupled to said reel, said brake being operated to retard the rotation of said reel caused by the unwinding of said ends of the cable loop from said aligned cable winding drums of the reel when the said loop is placed under load, and a retrieve unit for rewinding the respective arrest cable loop ends onto said aligned drums, said retrieve unit including a fluid powered turbine drivably coupled to said reel to rotate the same in a reverse direction to the direction of rotation thereof during cable payout independently of said brake.

5. An energy absorber unit comprising a reel, said reel having aligned cable winding drums, a loop of cable having each end of the loop wound on one of the drums so as to leave an extended center arrest loop portion, said loop being reeved across a landing surface, a fluid brake operatively coupled to said reel, said brake being operated to retard the rotation of said reel caused by the unwinding of said ends of the cable loop from said aligned cable winding drums of the reel when the said loop is placed under load, and a retrieve unit for rewinding the respective arrest cable loop ends onto said aligned drums, said retrieve unit including power means drivably coupled to said reel to rotate the same in a reverse direction to the direction of rotation thereof during cable payout.

6. An energy absorber unit for arresting a mobile object comprising a fixed housing, an impeller shaft journalled in said housing and extending therethrough, said housing being connected with a source of liquid, stator blades secured to the interior of said fixed housing, said shaft having radial impeller vanes secured thereto, one of each of said vanes being adjacent one of each of said stator blades, a reel in positive driving connection with said shaft during the unwinding of the reel, and an arresting cable reelable and unreelable upon said reel having an extended bridle portion for engagement with an object to be arrested, said reel including two drums, one of each drums serving to reel and unreel one of the free ends of said bridle portion.

References Cited in the file of this patent

UNITED STATES PATENTS

| | | |
|---|---|---|
| 1,992,911 | De La Mater | Feb. 26, 1935 |
| 2,731,219 | Cotton et al. | Jan. 17, 1956 |
| 2,777,653 | Cotton et al. | Jan. 15, 1957 |
| 2,860,734 | Ashton | Nov. 18, 1958 |
| 2,953,222 | Waldron | Sept. 20, 1960 |
| 2,967,683 | Crater | Jan. 10, 1961 |
| 2,977,076 | Byrne et al. | Mar. 28, 1961 |

OTHER REFERENCES

Aerospace Engineering, May 1961, pages 24, 25, 55–58.

UNITED STATES PATENT OFFICE
CERTIFICATE OF CORRECTION

Patent No. 3,139,249                                      June 30, 1964

William E. Trifillis

It is hereby certified that error appears in the above numbered patent requiring correction and that the said Letters Patent should read as corrected below.

Column 2, line 26, for "opening" read -- openings --; column 3, line 21, for "not" read -- now --.

Signed and sealed this 3rd day of November 1964.

(SEAL)
Attest:

ERNEST W. SWIDER
Attesting Officer

EDWARD J. BRENNER
                                               Commissioner of Patents